US 11,349,821 B2

(12) United States Patent
Hallam-Baker

(10) Patent No.: US 11,349,821 B2
(45) Date of Patent: May 31, 2022

(54) SYSTEM AND PROCESS FOR TLS EXCEPTIONALLY VERIFIED EAVESDROPPING

(71) Applicant: Phillip Hallam-Baker, Medford, MA (US)

(72) Inventor: Phillip Hallam-Baker, Medford, MA (US)

( * ) Notice: Subject to any disclaimer, the term of this patent is extended or adjusted under 35 U.S.C. 154(b) by 428 days.

(21) Appl. No.: 16/045,716

(22) Filed: Jul. 25, 2018

(65) Prior Publication Data

US 2019/0036892 A1    Jan. 31, 2019

Related U.S. Application Data

(60) Provisional application No. 62/537,363, filed on Jul. 26, 2017.

(51) Int. Cl.
*H04L 9/08* (2006.01)
*H04L 9/40* (2022.01)

(52) U.S. Cl.
CPC ........ *H04L 63/0478* (2013.01); *H04L 9/0838* (2013.01); *H04L 9/0894* (2013.01); *H04L 63/029* (2013.01); *H04L 63/0428* (2013.01); *H04L 63/166* (2013.01); *H04L 63/20* (2013.01)

(58) Field of Classification Search
CPC ... H04L 63/0478; H04L 63/20; H04L 63/166; H04L 63/029
USPC ........................................................ 713/151
See application file for complete search history.

(56) References Cited

U.S. PATENT DOCUMENTS

| | | | | |
|---|---|---|---|---|
| 6,161,181 | A * | 12/2000 | Haynes, III | G06Q 20/382 380/37 |
| 7,971,234 | B1 * | 6/2011 | Sussland | G06F 21/606 726/5 |
| 8,856,869 | B1 * | 10/2014 | Brinskelle | G06F 21/6218 726/2 |
| 9,673,975 | B1 * | 6/2017 | Machani | H04L 9/0822 |
| 10,686,831 | B2 * | 6/2020 | Anderson | H04L 63/0428 |
| 2003/0226017 | A1 * | 12/2003 | Palekar | H04L 63/08 713/168 |
| 2007/0260871 | A1 * | 11/2007 | Paya | H04L 63/0428 713/151 |
| 2007/0297418 | A1 * | 12/2007 | Lee | H04L 63/00 370/395.52 |

(Continued)

OTHER PUBLICATIONS

Chakravarty, Sambuddho et al. "Detection and Analysis of Eavesdropping in Anonymous Communication Networks." International journal of information security 14.3 (2014): 205-220. Web. (Year: 2014).*

*Primary Examiner* — Thanhnga B Truong
*Assistant Examiner* — Angela R Holmes
(74) *Attorney, Agent, or Firm* — Joseph P. Aiena

(57) ABSTRACT

Although TLS provides desirable end-to-end encryption, there are circumstances in which it is desirable or a regulatory requirement for a client to establish a TLS connection through an intermediary that is capable of creating an archival record. There is provided a modification to the TLS protocol that allows an aware client to provide a recovery record to such an intermediary. The recovery record permits the intermediary to verify that the encrypted recovery records can be decrypted by a party that holds the corresponding private key but does not enable decryption by the intermediary.

11 Claims, 2 Drawing Sheets

(56) References Cited

U.S. PATENT DOCUMENTS

| | | | | |
|---|---|---|---|---|
| 2008/0222714 | A1* | 9/2008 | Wahl | H04L 63/08 726/9 |
| 2012/0149353 | A1* | 6/2012 | Helfrich | H04W 4/70 455/418 |
| 2013/0034230 | A1* | 2/2013 | Takahashi | H04M 1/67 380/270 |
| 2013/0198512 | A1* | 8/2013 | Rubin | H04L 63/0823 713/157 |
| 2015/0006887 | A1* | 1/2015 | Brand | G06F 21/33 713/156 |
| 2017/0325113 | A1* | 11/2017 | Markopoulou | H04W 12/35 |
| 2019/0114852 | A1* | 4/2019 | Hodge | H04B 5/0037 |

* cited by examiner

SYSTEM AND PROCESS FOR TLS EXCEPTIONALLY VERIFIED EAVESDROPPING

BACKGROUND

Encryption protects confidentiality but presents operational and compliance concerns. Many enterprises, (brokerages, for example) are required to record all communications into or out of their site. Furthermore, debugging a network issue in a network where all traffic is encrypted is at the very least considerably more difficult than in plaintext.

The most commonly employed means of supporting the exceptional access capability at present is to not encrypt communications at all. This is the approach employed in many process control systems. While not using encryption at all provides the desired access to operators, this suffers from the readily apparent disadvantage that the same access is afforded to attackers.

Another scheme employed in many commercial products today is to perform an active man in the middle attack on the TLS. Attempts to establish a TLS connection to a host outside the network are directed to a Man-in-the-middle (MITM) proxy which decrypts and re-encrypts the traffic. This approach requires the MITM proxy to be an active participant in the communication. This is generally unacceptable for communications within an enterprise network where the proxy becomes a bottleneck through which all traffic must pass. In addition, the proxy must be capable of impersonating any of the sites that the client might communicate with. This requires the clients to have a 'root of trust' for the interception PKI installed. This has adverse consequences to the legitimate WebPKI and introduces a single point of failure into the trust system.

Exceptional access to traffic within an enterprise network is typically performed using a passive approach. The MITM proxy reads but does not modify the traffic. This approach requires the MITM proxy to have the private key of the TLS host. However, the requirement for access to the TLS host private key limits use of the passive approach to internal network traffic. In addition the approach is not compatible with the use of a Perfect Forward Secrecy protocol as is strongly encouraged in TLS/1.2 and required in TLS/1.3. Another important disadvantage is that the proxy presents a single point of failure for the security of the entire network.

A third scheme proposed by Green et. al., *Data Center use of Static Diffie-Hellman in TLS* 1.3 Jul. 2017 draft-green-tls-static-dh-in-tls13-01, permits passive interception in the case that a Perfect Forward Secrecy protocol is used. Instead of using a new Diffie Hellman key agreement parameter for each communication, the host uses a fixed key. While this approach is compatible with use of TLS/1.3, it has all the other disadvantages of the previous scheme(s) and introduces an additional issue of fixing the host key used for the ephemeral Diffie-Hellman exposes the exchange to related key attacks.

The existing approaches are unsatisfactory because none can satisfy all the deployment scenarios. External communications are only supported by an active attack while internal communications require a passive approach. Another important limitation on these approaches is that the intercept device has the ability to decrypt any communication at any time without any restrictions or limitations. Compromise of the intercept device thus represents a compromise of the entire network.

SUMMARY

The TLS-EVE (TLS—Exceptionally Verified Eavesdropping) protocol is a modification of the TLS protocol to enable a TLS-EVE aware client to negotiate a TLS tunnel through an intermediary such that the intermediary can determine that the communication can be decrypted by use of an offline key. TLS-EVE, is a modification of the TLS interaction between the client and the intermediary that replaces the Perfect Forward Secrecy mechanism with a new mechanism that makes use of partial Diffie-Hellman key agreement.

The present invention describes an improved approach to providing TLS intercept capabilities required by certain enterprise customers. The present invention provides a means of providing exceptional access to encrypted communications that improves on the existing art by 1) fully supporting the new TLS/1.3 protocol and 2) separating the functions of collecting and decrypting the encrypted communications.

While the invention as described applies to TLS, the same approach could be applied to QUIC, IP SEC or SSH.

DETAILED DESCRIPTION

Figure 1:
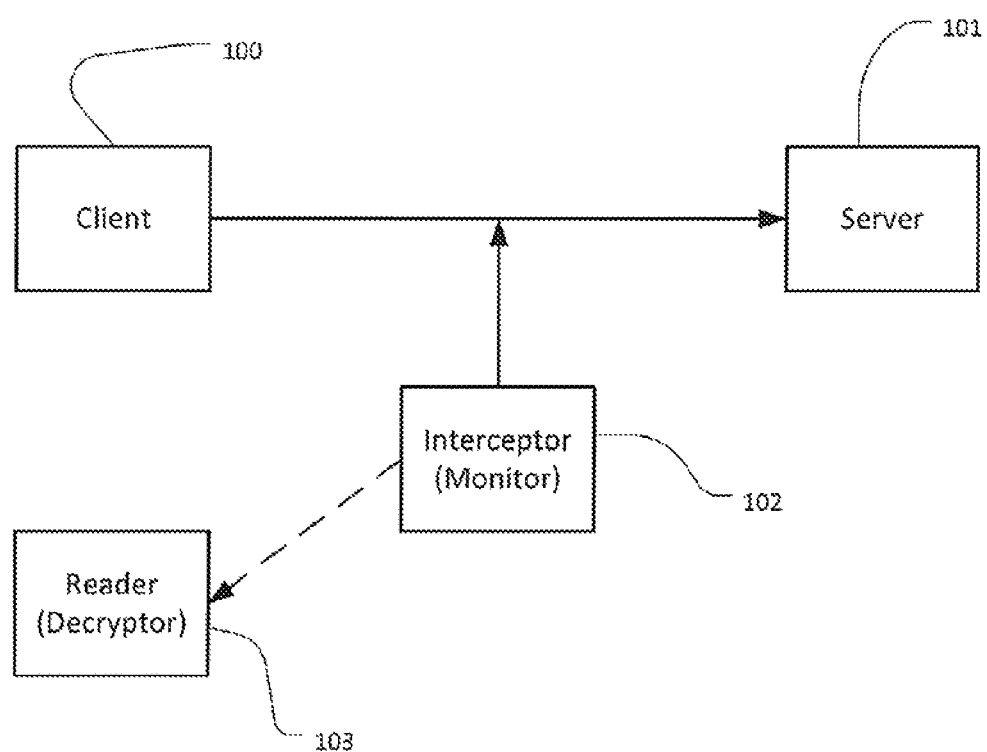
FIG. 1 is a schematic of the present invention.

The TLS protocol provides a secure socket or tunnel between two network devices, a client (that initiates the communication) and a server (that responds to the communication request). The TLS protocol provides multiple key agreement schemes that provide Perfect Forward Secrecy. These schemes make use of either Diffie Hellman using the discrete log problem or Elliptic Curve Diffie Hellman. For simplicity, the protocol is described using the discrete log form, but the same approach may be applied in an Elliptic Curve Diffie Hellman as described later.

In each case the general approach is as follows, let p be a prime and g be a primitive root modulo p.
Client generates ephemeral Diffie Hellman key pair $\{x, |g^x|p\}$, passes $|g^x|_p$ to the server.
Server generates ephemeral Diffie Hellman key pair $\{y, |g^y|_p\}$, passes $|g^y|_p$ to the client using some mechanism that provides authentication of the value under the Server certificate.
The client and server both calculate the shared session key $|g_{xy}|_p$ as follows:
Client knows x (generated locally) and $|g^y|_p$ (from the server), $|(|g^y|_p)^x = |(g^y)^x|_p = |g^{xy}|_p$
Server knows y (generated locally) and $|g^x|_p$ (from the server), $|(|g^x|_p)^y = |(g^x)^y|_p = |g^{xy}|_p$ To achieve Imperfect Forward Secrecy, the protocol is modified as follows:

First, there is an introduction of two additional parties, an interceptor and a decryptor. The interceptor has the ability to observe packets and determine that they are compliant with the protocol. Only the decryptor has the ability to decrypt packets.

The same technique may be applied to other protocols that either make use of Perfect Forward Secrecy or may be modified to do so. Such protocols include IPSEC, SSH and QUIC.

The same approach may also be applied to TLS but with disclosure of the ephemeral private key taking place at the client side.

Unlike the previous approaches, a single modified TLS client may be used to establish TLS sessions that permit exceptional access with either internal or external hosts. In either case, the exceptional access approach is passive and does not rely on either forged credentials or knowledge of the server private key.

The functions of interception and decryption are separated such that the interception device can determine that TLS communications can be decrypted but does not have the ability to decrypt them. Thus the interception device is not in itself a trusted device, compromise of the interception device does not compromise the network communications unless the decryption device is also compromised.

Depending on the precise specification of TLS/1.3, the possibility exists to implement the protocol without the need to make use of either forged server credentials or knowledge of the server private key while maintaining compatibility with other TLS/1.3 implementations.

EVE Imperfect Forward Secrecy

The TLS-EVE protocol provides Imperfect Forward Secrecy. A passive monitor observing the network traffic can determine that TLS-EVE messages can be decrypted by an authorized party but is not necessarily capable of decrypting the traffic itself.

Discloser
The party that discloses its key agreement material, this may be either the client or the server.

Counter-Party
The party that does not disclose its key agreement material.

Monitor
A party that intercepts communications and determines that they can be decrypted but is not capable of decrypting them.

Decryptor
A party that has the ability to decrypt the communications.

The Imperfect Forward Secrecy protocol may be implemented with disclosure occurring on the client side, the server side or both. This describes the case where disclosure takes place at the client.

The Client, Server, Monitor and Decryptor are provisioned with cryptographic keys as follows:

Client
Has the decryptor private key $D_s=d$

Server
Has the server private key $S_s$ and certificate C

Monitor
Has the server private key $S_s$ and decryptor public key $D_p=|e^d|p$

Decryptor
Has the decryptor private key $D_s=d$

The possible means by which these keys are established is described in the following section.

The key S_s is only required if the key exchange is encrypted. This is the case for TLS/1.2 but not for TLS/1.3.

The key pair $\{D_s, D_p\}$ is a Diffie Hellman key pair, $\{d, |e^d|p\}$

To perform an Imperfect Forward Secrecy exchange, the client first generates an ephemeral key pair, $\{x, |e^x|p\}$. This is used to perform a normal PFS exchange with the server, passing the value $|e^x|p$ to the server.

In addition, the client passes the value d-x to the server en-clair. This allows the monitor and decryptor to verify that the communication can be decrypted and to decrypt the communication respectively, as follows:

Monitor
Has the decryptor public key $|e^d|p$, obtains $|e^x|p$ and d-x from the channel. Calculates $|e^{d-x}|p$, verifies that $|e^x|p$. $|e^{d-x}|p|=p|e^d|p$.

Decryptor
Has the decryptor private key d, obtains d-x from the channel. Calculates $x=d-(d-x)$ and thus the means to perform the key exchange from the information provided by the server.

Protocol Mapping

Cryptographic hygiene demands that each discloser party have a unique decryptor key pair. Otherwise the security gained from separating the monitor and decryptor functions is lost because the network master decryption key is known to discloser. Furthermore it is highly desirable that the disclosure keys be rotated frequently so that the decryption capabilities granted to an authorized party can be closely controlled.

To implement the protocol in practice it is thus necessary to provision the necessary keying material to each party. The task of key distribution is assigned to a key distribution service.

For reasons of efficiency and reliability, it is desirable that the number of parties required to communicate directly with the key manager is kept to a minimum. It is especially desirable that the Monitor be entirely passive and perform its function from the 'bits on the wire'

Passing the decryptor public key $D_p$ to the monitor in-band in the form of an interception certificate signed by the key distribution system eliminates the need for the monitor to communicate with the key distribution service.

It is also possible to eliminate the need for the Decryptor to communicate with the key distribution service by encrypting the decryptor private key and including it in the interception certificate. This approach is less attractive however as it limits the degree to which the activities of the decryptor may be controlled and audited.

Referring to FIG. 1, there is shown the present invention. A client device 100 of a network is in communication with a server 101 by an established TLS tunnel connection (secure socket). The client 100 initiated the communication and the server 101 responds to the communication request. An interceptor or monitor 102 is positioned between the client 100 and server 102 and has the ability to intercept the communications or communication packets of the traffic between client device 100 and server device 101 of the network. However, the monitor/interceptor does not have the ability to decrypt the traffic, only to observe and determine compliancy with security and protocols. A reader or decryptor 103 is in communication with the monitor 102 and has the ability to decrypt packets.

Figure 2:
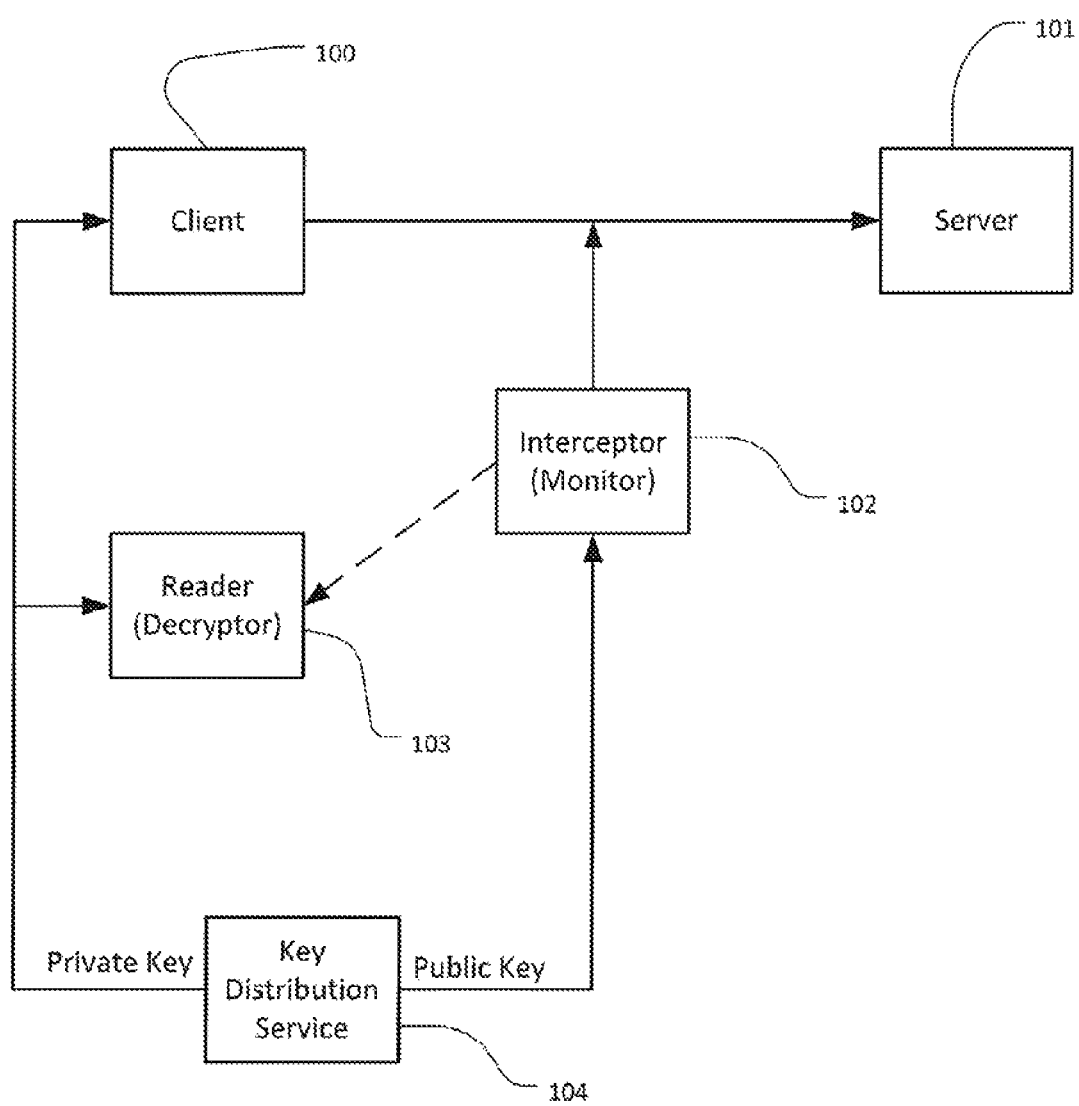
FIG. 2 is a schematic of the present invention with key distribution service.

FIG. 2 illustrates the invention shown in FIG. 1, with the added feature of a key distribution service 104 with public key information sent to the monitor 102 and private key information provided to the reader (decryptor) 103 and the client device 100.

What is claimed is:

1. A process for Transport Layer Security (TLS) intercept comprising:

negotiating a Transport Layer Security (TLS) tunnel to a server by a Transport Layer Security—Exceptionally Verified Eavesdropping (TLS-EVE) aware client through an intermediary, and performing an imperfect forward secrecy exchange by said client generating an ephemeral key pair $\{x, |e^x|p\}$ to perform a perfect forward secrecy exchange with said server by passing a value $|e^x|p$ to said server and said client passing a value d-x to said server en-clair;

determining by said intermediary that communication can be decrypted by use of an offline key;

decrypting said communications by a decryptor.

2. A process for encrypted communication intercept comprising:
   providing access to encrypted communications between a client and a server with an imperfect forward secrecy exchange by said client generating an ephemeral key pair {x, |e$_x$|p} to perform a perfect forward secrecy exchange with said server by passing a value |e$^x$|p to said server and said client passing a value d-x to said server en-clair;
   collecting said encrypted communications with a monitor, wherein said monitor is separate from a decryptor capable of decrypting said encrypted communications and said monitor is unable to decrypt said encrypted communications;
   receiving, by said monitor, an interception certificate;
   storing, by said monitor, said interception certificate in a memory location;
   accessing, by said monitor, said memory location to passively evaluate encrypted communication bits on the wire;
   collecting, by said monitor, encrypted communication compliant with said evaluation; and
   sending, by said monitor, said collected compliant encrypted communication to said decryptor, wherein said decryptor decrypts said encrypted communication.

3. The process according to claim 2 where said chosen encryption protocol is Transport Layer Security (TLS).

4. The process according to claim 2 of said monitor receiving said interception certificate comprising:
   passing a decryptor public key in-band from a key manager; and
   receiving said decryptor public key without requiring a response from said monitor;
   wherein said decryptor public key is in the form of an interpretation certificate.

5. The process according to claim 2 where said encrypted communication is saved within said monitor; and sending said encrypted communication to said decryptor for decryption.

6. The process according to claim 2 where said encrypted communication is not saved within said monitor; and
   routing said encrypted communication to said decryptor for decryption.

7. A system for Transport Layer Security (TLS) intercept comprising:
   a first network device which discloses key agreement material of said first network device;
   a second network device which does not disclose key agreement material of said second network device;
   a Transport Layer Security (TLS) tunnel established for communications between said first network device and said second network device; performing an imperfect forward secrecy exchange by said first network device generating an ephemeral key pair {x, |e$^x$|p} to perform a perfect forward secrecy exchange with said second network device by passing a value |e$^x$|p to said second network device and said first network device passing a value d-x to said second network device en-clair;
   a monitor for intercepting said communications between said first network device and said second network device and said monitor determining said communications can be decrypted but is incapable of decrypting said communications; and
   a decryptor for decrypting said communications.

8. The system according to claim 7 wherein said first network device is a client device.

9. The system according to claim 7 wherein said second network device is a server device.

10. The system according to claim 7 wherein said monitor observes communication packets and determines compliancy for security.

11. The system according to claim 7 wherein said first network device provides a recovery record to said monitor.

* * * * *